(12) United States Patent
Berthelot et al.

(10) Patent No.: US 6,535,669 B2
(45) Date of Patent: Mar. 18, 2003

(54) COMPENSATION OF POLARIZATION MODE DISPERSION OF A GRATING WRITTEN IN AN OPTICAL FIBER

(75) Inventors: Laurent Berthelot, Orsay (FR); Isabelle Riant, Orsay (FR); Pierre Sansonetti, Palaiseau (FR)

(73) Assignee: Alcatel, Paris (FR)

( * ) Notice: Subject to any disclaimer, the term of this patent is extended or adjusted under 35 U.S.C. 154(b) by 15 days.

(21) Appl. No.: 09/849,354

(22) Filed: May 7, 2001

(65) Prior Publication Data

US 2002/0122625 A1 Sep. 5, 2002

(30) Foreign Application Priority Data

May 11, 2000 (FR) .............................. 00 06004

(51) Int. Cl.$^7$ ................................ G02B 6/34
(52) U.S. Cl. ..................... 385/37; 385/10; 385/11; 385/124
(58) Field of Search .............. 385/37, 11, 31, 385/10, 122–128

(56) References Cited

U.S. PATENT DOCUMENTS 5,602,949 A   2/1997  Epworth .................. 385/37

FOREIGN PATENT DOCUMENTS

| EP | 0 635 736 A1 | 1/1995 |
| EP | 0 672 922 A2 | 9/1995 |
| WO | WO 98/06001 | 2/1998 |

OTHER PUBLICATIONS

T. Erdogan et al, "Characterization of UV–Induced Birefringence in Photosensitive GE–Doped Silica Optical Fibers", Journal of the Optical Society of America—B, US, Optical Society of America, vol. 11, No. 10, Oct. 1, 1994, pp. 2100–2105, XP000522490.

*Primary Examiner*—Phan T. H. Palmer
(74) *Attorney, Agent, or Firm*—Sughrue Mion, PLLC

(57) ABSTRACT

The invention relates to polarization mode dispersion; writing index variations in a grating written in an optical fiber generates polarization mode dispersion. The invention proposes to compensate this polarization mode dispersion by mechanical curvature of the fiber. The invention provides a simple method of compensating polarization mode dispersion effectively and improving the performance of a grating written in a fiber; it applies in particular to Bragg gratings.

7 Claims, 1 Drawing Sheet

COMPENSATION OF POLARIZATION MODE DISPERSION OF A GRATING WRITTEN IN AN OPTICAL FIBER

The present invention relates to gratings written in optical fibers, such as Bragg gratings, and more specifically it relates to the polarization mode dispersion of such gratings.

BACKGROUND OF THE INVENTION

Writing gratings in fibers is based on inducing index variations in the fiber by exposure to ultraviolet light. Exposing an appropriately doped optical fiber to ultraviolet light creates areas at more or less regular intervals in which the index varies. An optical component whose index varies along the fiber is called a written grating.

In the simplest case of a monomode fiber having an asymmetrical section conveying two modes that are linearly polarized in orthogonal directions, the birefringence of the fiber is defined as the index difference between two main polarization axes. The polarization direction in which the index is higher is called the linear birefringence axis. D. N. Payne et al., in "Development of Low- and High-birefringence Optical Fiber", IEEE Journal of Quantum Electronics, vol. QE-18 no. 4 (1982), pages 477–487, provide a definition of birefringence and discuss the various parameters that affect the birefringence of an optical fiber. Curvature, pressure, rotations of the fiber, magnetic fields and temperature are stated to influence birefringence.

Polarization mode dispersion is representative of the dispersion of a fiber or a component written in a fiber as a function of the polarization axes of the fiber; it is defined as the amplitude of the variation in the group delay time when the polarization of the incident light is varied over all possible polarization states. This quantity is directly linked to the axes of polarization in the fiber. There is a relationship between birefringence and polarization mode dispersion, at least in the case of linear birefringence. The relationship in the case of a fiber or in the case of a grating written in a fiber is given by I. Riant et al. in "Polarization mode dispersion analysis in fiber chromatic dispersion compensators", OFC'99, TuS2-1 p269. The remainder of the present description uses a formulation in terms of birefringence or in terms of polarization mode dispersion.

The birefringence or polarization mode dispersion of a written grating is a problem in that it makes the properties of the grating (in particular its reflectivity) polarization-dependent. This problem is particularly serious for transmission applications at high bit rates (in excess of 10 Gbit/s per channel).

A. M. Vengsarkar et al., in "Birefringence reduction in side-written photoinduced fiber devices by a dual exposure method", Optics Letters, vol. 19 no. 16 (1994), pages 1260–1262, raise the problem of the increased birefringence when side-writing gratings using ultraviolet light. The paper explains that the asymmetry of side-writing is one cause of increased birefringence. To reduce birefringence it is proposed to use a double-exposure technique or to expose a cylindrical fiber from both sides simultaneously.

T. Erdogan and V. Mizrahi, in "Characterisation of UV-induced birefringence in photosensitive Ge-doped silica optical fibers", J. Opt. Soc. Am. B, vol. 11 no. 10 (1994), pages 2100–2105, propose an explanation of the increased birefringence in gratings written in a fiber. They show that the use of ultraviolet light polarized along the propagation axis of the fiber to write the grating reduces birefringence. This solution has the drawback of reducing the photosensitivity, and therefore the maximum modulation of the index, of the grating.

The above-mentioned paper by I. Riant et al. discusses the influence on the polarization mode dispersion of a photo-induced grating of the polarization mode dispersion of the original fiber. It suggests writing gratings in low-birefringence fiber to limit the polarization mode dispersion of the gratings obtained. However, this solution imposes a limit in terms of the fibers in which a grating can be written.

OBJECTS AND SUMMARY OF THE INVENTION

The invention addresses the problem of birefringence in gratings written in an optical fiber. It proposes a simple solution that applies independently of the type of fiber used to write the grating. It enables writing by the various methods known in the art, with or without double exposure.

To be more precise, the invention proposes an optical fiber incorporating a written grating, the optical fiber having a curvature in a plane substantially perpendicular to the axis of the birefringence induced by writing the grating.

In a preferred embodiment the angle between said plane and the axis of the birefringence induced by writing the grating is in the range from 65° and 115°.

The curvature preferably extends at least into the area in which the grating is written.

In one embodiment the curvature is constant and has a value in the range from 5 $m^{-1}$ to 10 $m^{-1}$.

The written grating is advantageously a Bragg grating.

The invention also relates to an optical component including an optical fiber incorporating a written grating, wherein said fiber has a curvature in a plane substantially perpendicular to the axis of the birefringence induced by writing the grating.

The invention also proposes a chromatic dispersion compensator including at least one fiber as defined hereinabove.

BRIEF DESCRIPTION OF THE DRAWING

Other features and advantages of the invention will become apparent on reading the following description of embodiments of the invention, which description is given by way of example only and with reference to the accompanying drawing, in which the single FIGURE shows the measured polarization mode dispersion as a function of the radius of curvature of a fiber.

MORE DETAILED DESCRIPTION

Figure 1:
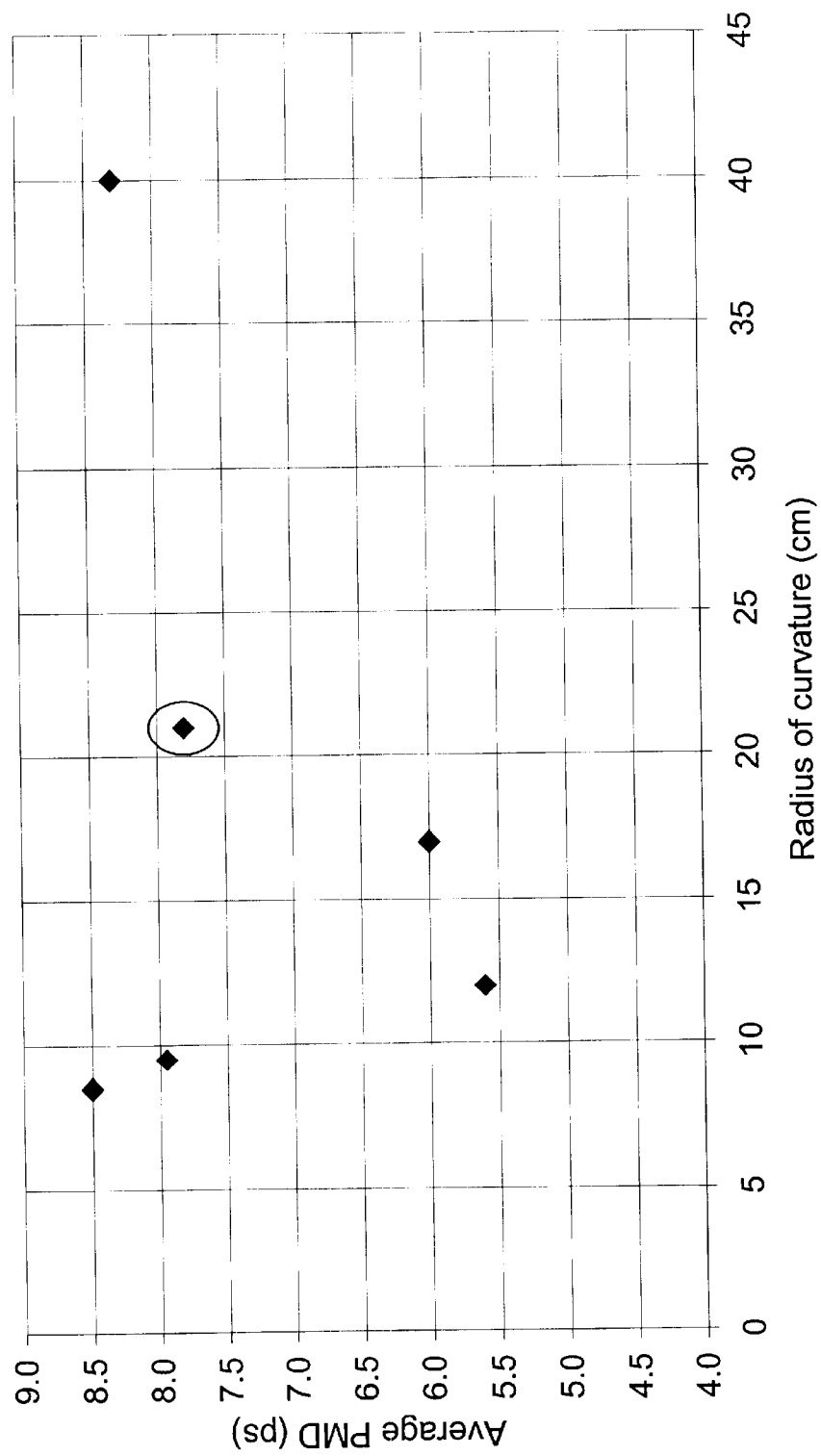

To reduce the polarization mode dispersion of a grating written in a fiber, the invention proposes to curving the fiber so as to induce polarization mode dispersion in the fiber that compensates the effects of polarization mode dispersion induced by writing the grating. To be more precise, curving the fiber induces linear birefringence along the axis of the fiber defined by the plane of curvature, and the linear birefringence is a decreasing function of the curvature of the fiber.

In a grating written by the conventional methods of irradiation with ultraviolet light, the birefringence is also linear, along an axis that is a function of the irradiation. For side irradiation of the fiber from one side only, the birefringence axis corresponds to the irradiation direction. The birefringence axis also corresponds to the irradiation direction for irradiation of the fiber from both sides.

The invention proposes curving the fiber in a plane that is substantially perpendicular to the axis of the birefringence induced in the fiber by writing the grating. That axis can be identified on the fiber when writing the grating; it can also be determined experimentally by measuring the birefringence when the fiber is not curved.

The curvature imposed on the fiber induces birefringence that compensates the birefringence induced by writing the grating. In fact, writing the grating tends to increase the index along a first polarization axis relative to the index along the second polarization axis; conversely, because of the angle between the plane and the first polarization axis, the curvature tends to increase the index along the second polarization axis relative to the first polarization axis. It is therefore preferable for the angle between the curvature plane and the birefringence axis to be as close to 90° as possible. In practice the angle is in the range from 65° to 115°.

The radius of curvature imposed on the fiber depends on the birefringence induced by writing the grating. The radius of curvature can be determined experimentally, as explained with reference to the FIGURE.

The FIGURE is a graph of the measured polarization mode dispersion of a fiber plotted as a function of the radius of curvature of the fiber. The example shown in the FIGURE refers to a stepped index monomode optical fiber in which the core was doped with germanium and in which a grating was side-written by irradiation with ultraviolet light. The grating was written using a chirped phase mask having a central pitch of 1066.97 nm and a chirp of 0.154 nm/cm, over a length of a 50 mm, with a uniform index variation of approximately $10^{-4}$. In this context, the term "chirp" means a variation in the pitch of the grating along the fiber. The measured polarization mode dispersion of the grating with a straight fiber was 8.7 ps. The fiber was then curved in a plane perpendicular to the axis of the birefringence induced by writing the grating with varying radii of curvature.

The measured total polarization mode dispersion of the curved fiber in ps is plotted on the ordinate axis. The birefringence was the result of writing the grating and also of the curvature applied to the fiber. The radius of curvature applied to the fiber in cm is plotted on the abscissa axis; the total polarization mode dispersion of the fiber varied as the radius of curvature was varied. In the example shown in the FIGURE, the radius of curvature was varied in the range from 8 to 40 cm. The FIGURE shows that the polarization mode dispersion for small radii of curvature was greater than 8 ps; for radii greater than 40 cm the total polarization mode dispersion in the fiber was close to the polarization mode dispersion induced by writing the grating.

As the radius of curvature was decreased, the polarization mode dispersion induced by the curvature increased, and counterbalanced the polarization mode dispersion induced by writing the grating. The total polarization mode dispersion of the fiber decreased; in this example it reached a minimum value close to 5.5 ps for a radius of curvature of the order of 12 cm.

As the radius of curvature was decreased further, the polarization mode dispersion induced by the curvature increased further and exceeded the polarization mode dispersion induced by writing the grating. The total polarization mode dispersion of the fiber was again increased. The axis of the birefringence in the fiber was then perpendicular to the axis of the birefringence in the straight fiber.

The values of the radii of curvature applied in accordance with the invention can be determined experimentally, by varying the radius and measuring the birefringence, as explained with reference to the FIGURE. The radii depend on the birefringence of the grating. The radius of curvature applied to the fiber is preferably in the range 10 cm to 20 cm; these values correspond to a range of curvature in the range 5 $m^{-1}$ to 10 $m^{-1}$. The lower limit of this range corresponds to a situation in which the birefringence induced by the curvature is greater than the birefringence induced by writing the grating; in this case, the total birefringence of the fiber is along the same axis as the birefringence induced by the curvature of the fiber. The upper limit of the range corresponds to a situation in which the birefringence induced by the curvature is less than the birefringence induced by writing the grating; in this case, the total birefringence of the fiber is along the same axis as the birefringence induced by writing the grating.

The invention can be implemented using any mechanical device for curving the fiber and holding it in a given position in a given plane. An appropriate receptacle is a spool or an arc of a spool around which a length of the fiber in the vicinity of the written grating is wound. The fiber of the invention preferably has a curvature in the area in which the grating is written. The curvature can be applied outside that area; in fact, birefringence in the fiber upstream or downstream of the grating can also compensate birefringence induced by writing the grating. However, it is preferable to apply the curvature to the grating itself, to limit the quantity of fiber around the grating. Also, this has the advantage of avoiding any drift in the birefringence between the grating and the place at which the curvature is applied.

The invention applies to all types of written grating, and in particular to Bragg gratings; it also applies to gratings that feature a "chirp", i.e. a variation of the pitch of the grating along the grating, and/or apodization, i.e. a variation in the modulation of the index along the grating. It reduces birefringence in such gratings. The invention applies in particular to gratings used as chromatic dispersion compensators, which must have a low birefringence.

Of course, the present invention is not limited to the examples and embodiments described and shown, many variants of which will suggest themselves to the skilled person. Digital models can be used to calculate the curvature to be applied to the grating. It is also possible to apply a non-constant curvature, for example by winding the fiber around an elliptical or FIGURE-of-eight surface. In this case the birefringence can be measured as explained with reference to the FIGURE.

What is claimed is:

1. An optical fiber incorporating a written grating, the optical fiber having a curvature in a plane substantially perpendicular to the axis of the birefringence induced by writing the grating.

2. The optical fiber of claim 1, wherein the angle between said plane and the axis of the birefringence induced by writing the grating is in the range 65° and 115°.

3. The optical fiber of claim 1, wherein the curvature extends at least into the area in which the grating is written.

4. The optical fiber of claim 1, wherein the curvature is constant and has a value in the range 5 $m^{-1}$ to 10 $m^{-1}$.

5. The optical fiber of claim 1, wherein the written grating is a Bragg grating.

6. An optical component including an optical fiber according to claim 1.

7. A chromatic dispersion compensator including at least one fiber according to claim 1.

* * * * *